United States Patent
Lin et al.

(10) Patent No.: US 9,133,976 B2
(45) Date of Patent: Sep. 15, 2015

(54) VARIABLE HEIGHT TROLLEY AND HEIGHT DISPLAYING ASSEMBLY THEREOF

(71) Applicants: KINPO ELECTRONICS, INC., New Taipei (TW); CAL-COMP ELECTRONICS & COMMUNICATIONS COMPANY LIMITED, New Taipei (TW)

(72) Inventors: Chuan-Kai Lin, New Taipei (TW); Sheng-Kai Lai, New Taipei (TW)

(73) Assignees: KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 20 days.

(21) Appl. No.: 14/154,274

(22) Filed: Jan. 14, 2014

(65) Prior Publication Data

US 2015/0159803 A1 Jun. 11, 2015

(30) Foreign Application Priority Data

Dec. 6, 2013 (TW) .............................. 102144798 A (51) Int. Cl.
*A47B 9/00* (2006.01)
*F16M 11/24* (2006.01)
(52) U.S. Cl.
CPC . *F16M 11/24* (2013.01); *A47B 9/00* (2013.01)

(58) Field of Classification Search
CPC ............ G01B 7/02; G01B 7/026; A47B 9/00; A47B 9/16
USPC ............... 108/145, 144.11, 147; 33/700, 754, 33/732, 734, 755, 774, 776
See application file for complete search history.

(56) References Cited

U.S. PATENT DOCUMENTS

| | | | | |
|---|---|---|---|---|
| 2,581,023 A * | 1/1952 | Jerick | ............................ | 108/145 |
| 3,067,521 A * | 12/1962 | Platt, II | ............................ | 33/700 |
| 3,159,920 A * | 12/1964 | Garrett | ............................ | 33/734 |
| 3,693,682 A * | 9/1972 | Hasfjord | ......................... | 33/628 |
| 4,744,712 A * | 5/1988 | Mitchell | ........................ | 108/145 |
| 5,632,209 A * | 5/1997 | Sakakibara | .................... | 108/145 |
| 5,967,059 A * | 10/1999 | Jensen | ............................ | 108/145 |
| 6,240,647 B1* | 6/2001 | Moustgaard et al. | ........... | 33/774 |
| 6,494,239 B1* | 12/2002 | Liao | ............................ | 248/188.2 |
| 6,705,238 B1* | 3/2004 | Heckert | ........................ | 108/145 |
| 7,246,977 B1* | 7/2007 | Chuang et al. | .................... | 33/772 |
| 7,823,612 B2* | 11/2010 | Balolia | ........................ | 144/114.1 |
| 8,851,462 B2* | 10/2014 | Liu | ............................ | 269/289 R |
| 2007/0034125 A1* | 2/2007 | Lo | ............................ | 108/145 |
| 2013/0145972 A1* | 6/2013 | Knox et al. | .................... | 108/145 |

* cited by examiner

*Primary Examiner* — Jose V Chen
(74) *Attorney, Agent, or Firm* — Li&Cai Intellectual Property (USA) Office (57) ABSTRACT

A variable height trolley and a height displaying assembly thereof, and the height displaying assembly includes a height indicator unit, a spool and an connecting unit. The height displaying assembly obtains a height of platform from a serial mechanical action between the connecting unit and the platform. The height displaying assembly uses mechanical approach to instantly show the height of the platform.

13 Claims, 7 Drawing Sheets

VARIABLE HEIGHT TROLLEY AND HEIGHT DISPLAYING ASSEMBLY THEREOF

CROSS-REFERENCE TO RELATED APPLICATION

This application claims the priority benefit of Taiwan application serial no. 102144798, filed on Dec. 6, 2013. The entirety of the above-mentioned patent application is hereby incorporated by reference herein and made a part of this specification.

BACKGROUND

1. Field of the Invention

The instant disclosure relates to a variable height trolley; in particular, to a trolley having height displaying assembly.

2. Description of Related Art

A variable height trolley has height adjustable platform. Its supporting frame is very often pairs of scissor links, such that a user can change the platform height by adjusting the supporting frame. However, an accurate height may not be able to achieve in one go.

When the accurate height of the platform should be known, it is usually achieved by measuring manually using, for example, measuring tape, infrared distance detector or laser distance detector. This type of measure requires additional tools and is rather inconvenient. Also, the height of platform cannot be obtained immediately.

BRIEF SUMMARY OF THE INVENTION

The instant disclosure provides a variable height trolley having height displaying assembly. With serial mechanical actions, a height of a platform can be shown.

According to one exemplary embodiment of the instant disclosure, the variable height trolley includes a platform, a supporting frame and a height displaying assembly. The platform has a height displaying window. The supporting frame serves to receive the platform and is reconfigurable to selectively change the height of the platform. The supporting frame includes a roller element that changes a position relative to the height of the platform. The height displaying assembly is disposed on the platform and displays the height of the platform from the height displaying window. The height displaying assembly includes a height indicator unit, a spool and an connecting unit. The height indicator unit is disposed on the platform and displays the height of the platform form the height displaying window. The spool is attached to the platform. The connecting unit has a first end and a second end opposite to the first end. The first end of the connecting unit is connected to the spool, and the second end of the connecting unit is connected to the roller element. The connecting unit guides the height indicator unit to display the height of the platform relative to a movement of the roller element.

The height displaying assembly further includes a guiding assembly and a guiding roller. The guiding assembly is disposed adjacent to the connecting unit to change a direction of connecting unit propagation, while the guiding roller is disposed adjacent to the connecting unit to change the direction of connecting unit propagation. The guiding assembly and the guiding roller are disposed between the spool and the roller element.

The height indicator unit further includes a height indicator and a cursor. The height indicator is disposed on a top surface of the platform, and the cursor is connected to the connecting unit and movable along with the connecting unit.

The supporting frame further includes a base, a rail, a first link and a second link. The rail is disposed underneath the platform to accommodate the roller element. The first link is disposed between the base and the platform, and the second link is disposed between the base and the platform. The roller element is pivotally connected to one end of the first link and movable along the rail.

The height indicator unit further includes a reel and an indicator ribbon. The reel is interactive with the spool, and the indicator ribbon winds about the spool and the reel. The connecting unit guides the spool such that the spool and the reel guide the indicator ribbon.

From another perspective, the height displaying assembly adapted to the variable height trolley shows the height of the platform from the height displaying window based on the serial mechanical action. The height displaying assembly includes a height indicator unit, a spool and an connecting unit. The height indicator unit is attached to the platform and displays the height of the platform from the height displaying window. The spool is attached to the platform. The connecting unit has a first end and a second end opposite to the first end. The first end of the connecting unit is connected to the spool, and the second end of the connecting unit is connected to the roller element. The connecting unit guides the height indicator unit to display the height of the platform relative to a movement of the roller element.

In summary, the serial mechanical action of the variable height trolley brings about the height information of the platform and allows instant information displaying. Since the height displaying assembly relies on mechanical energy, it does not require electrical power, and the user does not need additional tool to measure the height of the platform.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE INVENTION

The aforementioned illustrations and following detailed descriptions are exemplary for the purpose of further explaining the scope of the instant disclosure. Other objectives and advantages related to the instant disclosure will be illustrated in the subsequent descriptions and appended drawings. Throughout the present specification, expression of relative position such as "up", "down", "front", "rear", "left", "right" etc., are used solely for convenience and clarity in relation to an embodiment as oriented in the drawings. They are in no way intended to be limited as to the orientation of use of the instant disclosure. Similar elements are designed with the same reference symbol hereinafter.

First Exemplary Embodiment

Figure 1:
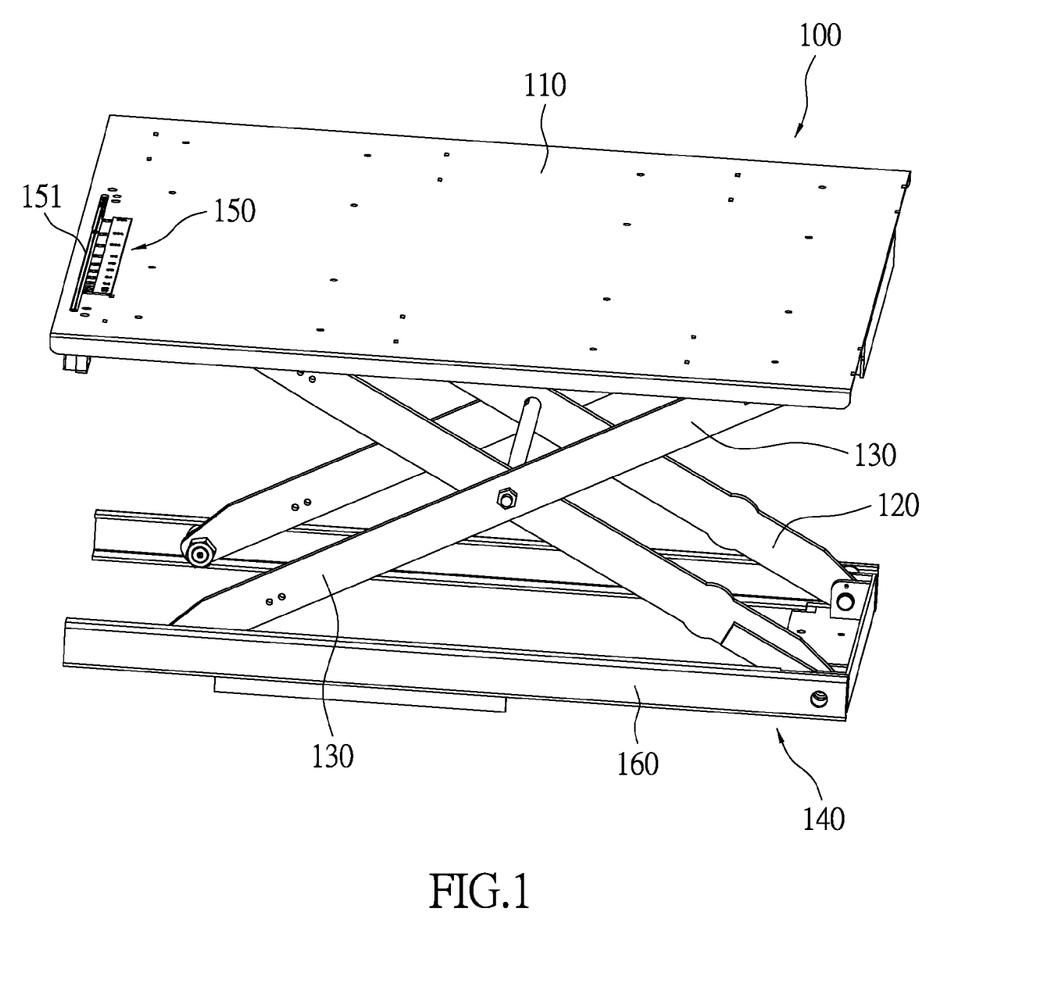
FIG. 1 shows a perspective view of a variable height trolley in accordance with a first embodiment of the instant disclosure.

FIG. 1 shows a perspective view of a variable height trolley in accordance with a first embodiment of the instant disclosure. The variable height trolley 100 includes a supporting frame 140, a platform 110 and a height displaying assembly 150. The platform 110 is formed with a height displaying window 151. The height displaying assembly 150 is disposed underneath the platform 110 and shows a height of the platform 110 from the height displaying window 151. The height displaying window 151 may be an opening or a visually transparent display window. For example, the window may be covered by glass or plastic, and the instant disclosure is not limited thereto. The height displaying window 151 may be on a top face of the platform 110, such that a user can see immediately. The height displaying assembly 150 may be disposed underneath the platform 110 or at a side thereof. Alternatively, the height displaying assembly 150 may be disposed on the supporting frame 140, and the instant disclosure is not limited to the aforementioned positions.

FIG. 1 focuses on the key features of the variable height trolley 100. However, the variable height trolley 100 may also include wheels, handles, hydraulic elevation system, pedals or the like (not shown), and the height displaying assembly 150 may be adapted to any types of variable height trolley.

Figure 2:
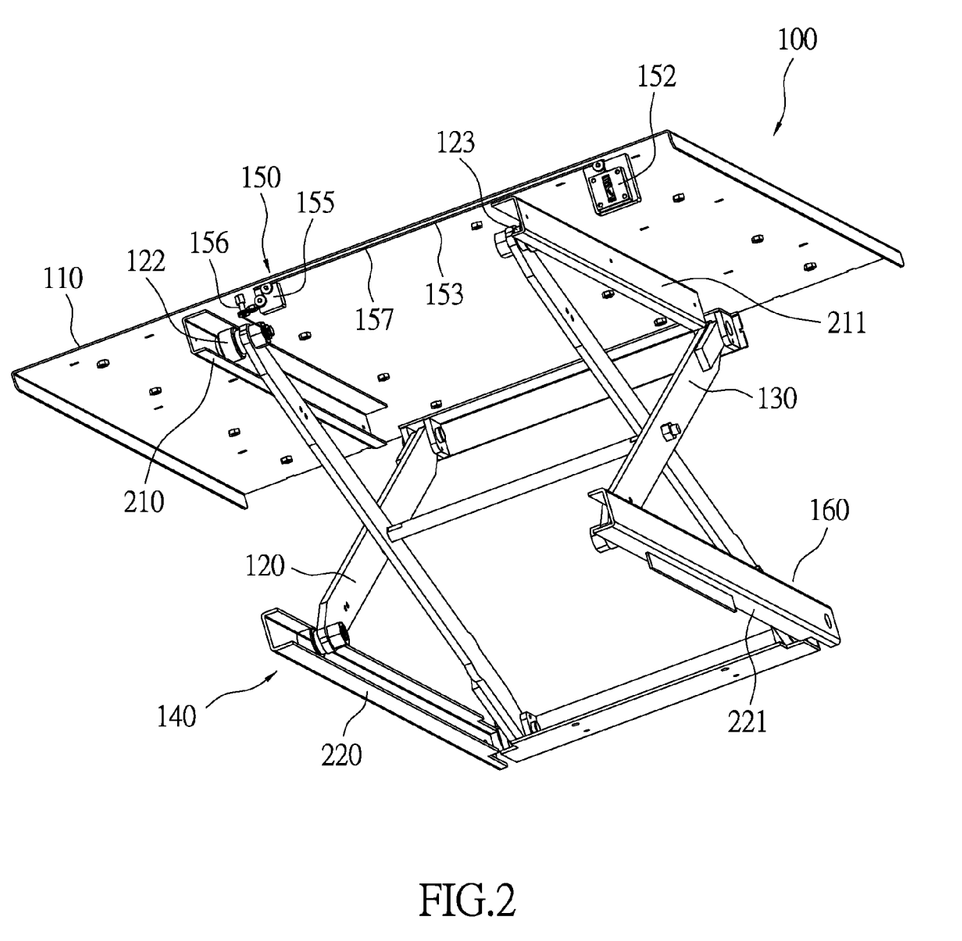
FIG. 2 shows another perspective view of a variable height trolley in accordance with a first embodiment of the instant disclosure.

Please refer to FIGS. 1 and 2. FIG. 2 shows another perspective view of the variable height trolley in accordance with the first embodiment of the instant disclosure. The supporting frame 140 includes a base 160, a pair of first links 120, a pair of second links 130 and rails 210, 211, 220, 221. The first and second links 120, 130 are scissor like frame. Two ends of the first and second links 120, 130 are pivotally connected to the platform 110 and the base 160 respectively. The rails 210, 211 are disposed underneath two sides of the platform 110 respectively. The rails 220, 221 are disposed on the base 160 respectively. The supporting frame 140 includes two roller elements 122, 123 connected between the links 120, 130 and the platform 110. One end of the roller element 122 is pivotally connected to the first links 120, while the other end thereof is movable along the rail 220. One end of the roller element 123 is pivotally connected to the second links 130, while the other end thereof is movable along the rail 211.

The height of the platform 110 is reconfigurable by adjusting the angle formed by the first and second links 120, 130. The roller elements 122, 123 slide along the rail 220, 221 as the height of the platform 110 changes. In other words, the roller elements 122, 123 move relative to the height position of the platform 110. The shift value of the roller element 122 and the height variation of the platform 110 can be derived from calculating the trigonometric function of the length and the angle between the pair of the first links 120. It should be noted that with different types of scissor links, the relationship between the shift value of the roller element 122 and the height variation of the platform 110 is varied. A person skilled in the art should be able to deduce the mechanism of platform 110 height adjustment from the above description so it is not further elaborated to avoid repetition.

Figure 3:
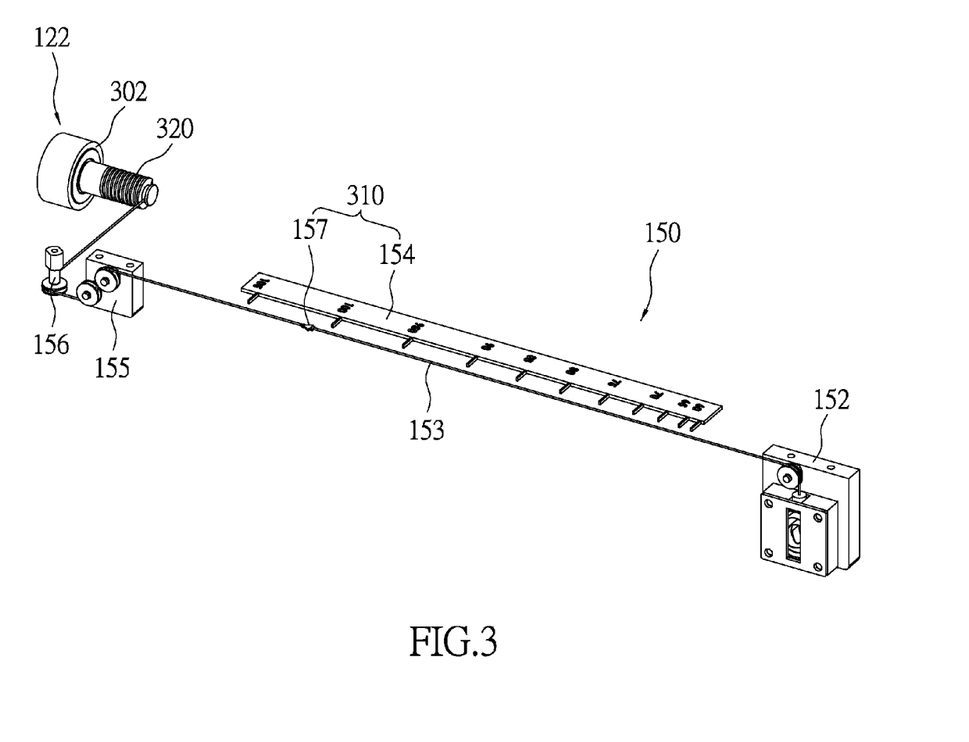
FIG. 3 shows a perspective view of a height displaying assembly 150 in accordance with a first embodiment of the instant disclosure.

Please refer to FIG. 3. FIG. 3 shows a perspective view of the height displaying assembly 150 in accordance with the first embodiment of the instant disclosure. The height displaying assembly 150 is a mechanical structure. More specifically, the height variation of the platform 110 and the shift value of the roller element 122 result in a serial mechanical action which helps to generate the height information of the platform 110. The user can learn the height of the platform 110 instantly. The height displaying assembly 150 includes a height indicator unit 310, a spool 152, an connecting unit 153, a guiding assembly 155 and a guiding roller 156. The height indicator unit 310 includes a height indicator 154 and a cursor 157. The spool 152 is attached underneath the platform 110 to receive the connecting unit 153. One end (first end) of the connecting unit 153 is connected to the spool 152, while the other end (second end) thereof is connected to the roller element 122. The guiding assembly 155 and the guiding roller 156 are attached underneath the platform 110 and adjacent to the connecting unit 153, serving to change a direction of the connecting unit 153 propagation. The height indicator 154 is marked with height index and disposed on the top face of the platform 110. The cursor 157 is disposed on the connecting unit 153, such that it moves along with the connecting unit 153 as the connecting unit 153 travels.

The roller element 122 includes a roller 302 and a shaft 320. The roller 302 rolls in the rail 210. The pair of the first links 120 is pivotally connected to the shaft 320. The position of the roller element 122 is related to the height of the platform 110, such that when the height of the platform is adjusted, the roller element 122 shifts together. As the roller element 122 shifts, the connecting unit 153 is pulled, and the cursor 157 walks along with the connecting unit. In other words, the movement of the cursor 157 is associated with the height of the platform 110. The relationship between the cursor 157 and the height of the platform 110 is marked on the height indicator 154 so as to show the instant height of the platform 110, as shown in FIG. 3. The user can learn the height of the platform 110 by viewing where the cursor 157 points at the height indicator 154 from the height displaying window 151.

The height measurement on the height indicator 154 should be varied according to the structure of the first and second links 120, 130. The height measurement will change in accordance with the shift value of the roller element 122 and the height variation of the platform 110. A person skill in the art should be able to obtain the relative structure adaption according to the above description. The cursor 157 is attached to the connecting unit 153, and its dimension or shape is subject to design requirement.

The spool 152 has thread recycling mechanism, for example, a torsion spring that provides a driving force to pull back the thread. When the connecting unit 153 is pulled by the roller element 122, a force is stored in the spool 152. When the roller element 122 slides reversely (i.e., the platform is lowered), the spool 152 automatically collect the connecting unit 153 by using the stored force. Different structures may be applied to the spool 152. For example, a weight may be hung at one end of the spool 152, or a spring may be connected to the other end of the thread. In the instant embodiment, the torsion spring facilitates the collection of the thread, yet the instant disclosure is not limited thereto.

The guiding assembly 155 and the guiding roller 156 serve to change a direction of the connecting unit 153 propagation, such that the connecting unit 153 smoothly translates the height information of the platform 110 from the roller element 122. The number of the guiding assembly 155 and the guiding roller 156 is subject to the structure of the variable height trolley 100. Different roller combination may also be adapted to achieve the same function. For example, either the guiding roller 156 or the guiding assembly 155 alone is used in another embodiment, or a shaft may be used to replace the guiding assembly 155 and the guiding roller 156.

Through mechanical structure, the height displaying assembly 150 is capable of measuring and showing the height of the platform 110. The user does not need additional tools to measure the height and the height of the platform can be obtained instantly and conveniently.

Second Exemplary Embodiment

Figure 4:
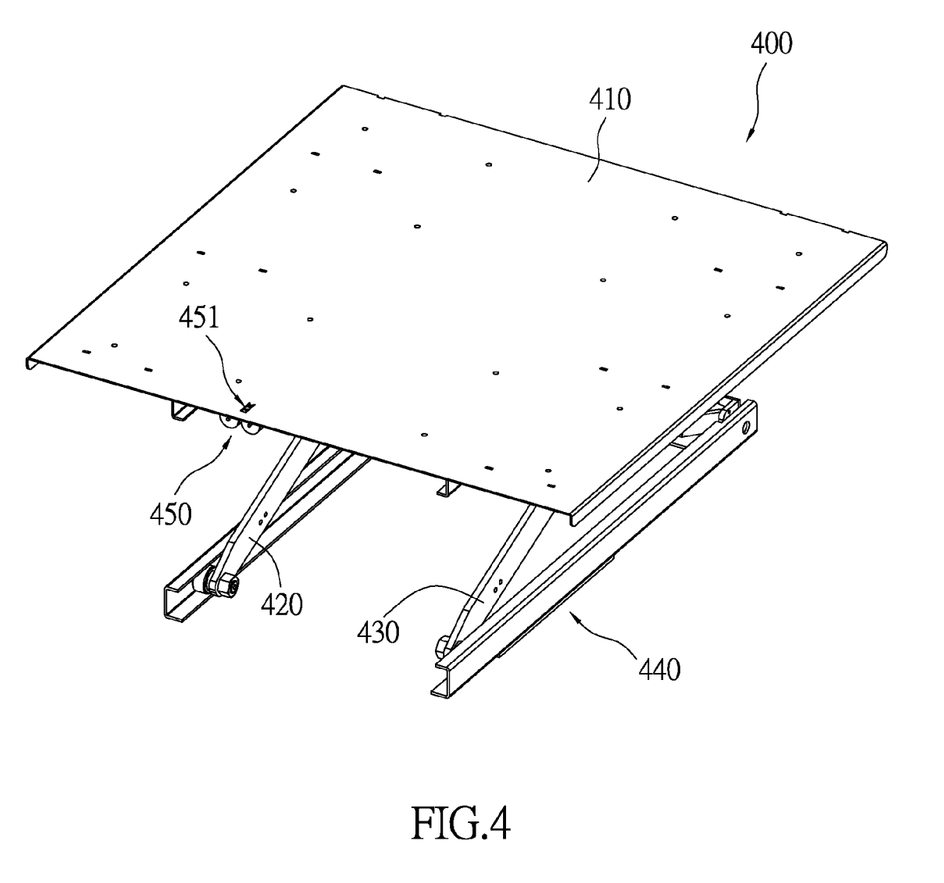
FIG. 4 shows a perspective view of a variable height trolley in accordance with a second embodiment of the instant disclosure.
Figure 5:
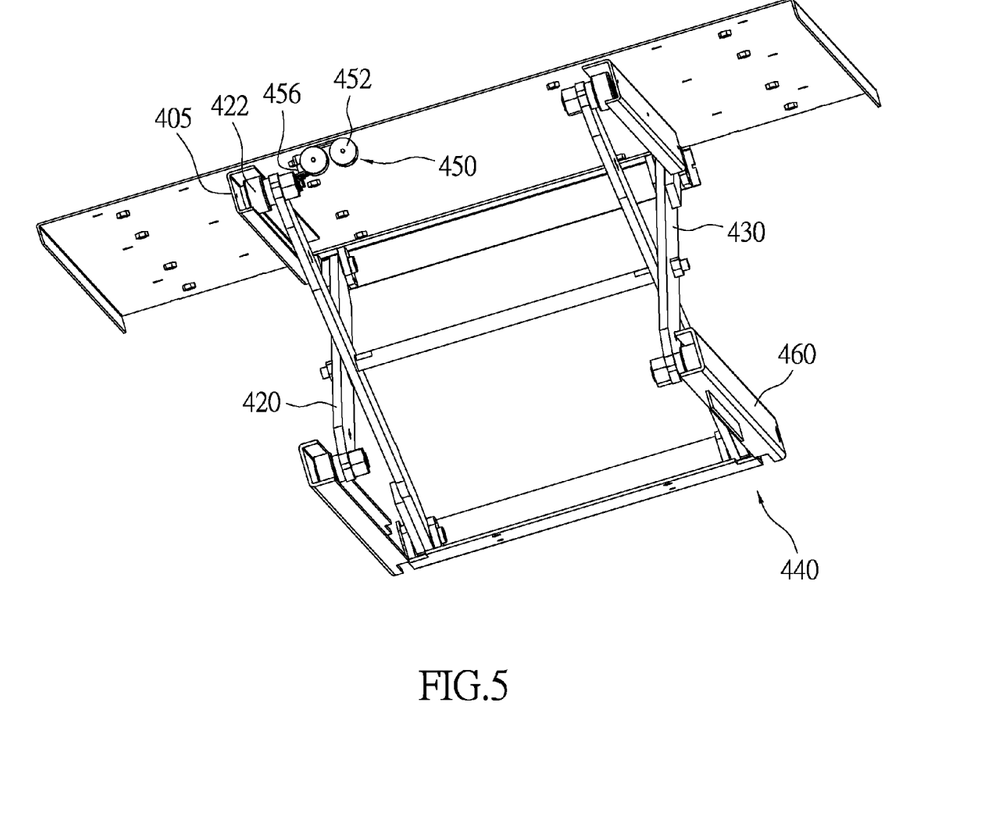
FIG. 5 shows another perspective view of a variable height trolley in accordance with a second embodiment of the instant disclosure.
Figure 6:
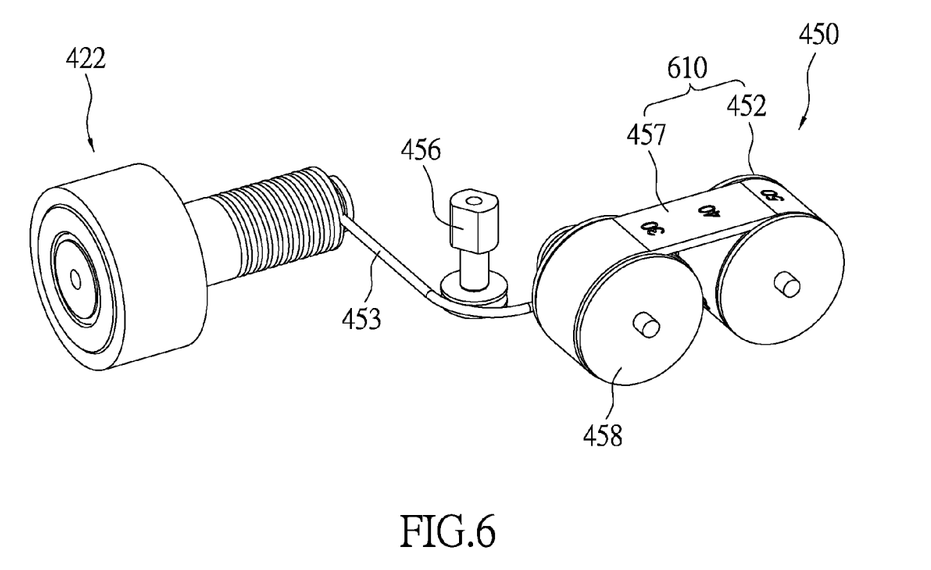
FIG. 6 shows a perspective view of a height displaying assembly 450 in accordance with a second embodiment of the instant disclosure.

Please refer to FIG. 4. FIG. 4 shows a perspective view of the variable height trolley in accordance with a second embodiment of the instant disclosure. The first and second embodiments use mechanical structure to fulfill the height displaying. The difference between the first and second embodiment lies on the height displaying assembly 450. Please refer to FIGS. 5 and 6. FIG. 5 shows another perspective view of the variable height trolley in accordance with the second embodiment of the instant disclosure. FIG. 6 shows a perspective view of the height displaying assembly 450 in accordance with the second embodiment of the instant disclosure.

The variable height trolley 400 includes the supporting frame 440, platform 410 and the height displaying assembly 450. The platform 410 is formed with a height displaying window 451. The height displaying assembly 450 is disposed underneath the platform 410, and the height of the platform 410 is visible through the height displaying window 451. The supporting frame 440 includes a pair of first links 420, a pair of second links 430, the base 460 and the rail 405. The core scaffold is the same as the supporting frame 140 of the first embodiment, it is not repeated herein. The height displaying window 451 provides instant access of the height of the platform 410.

The height displaying assembly 450 is a mechanical structure, including the spool 458, a reel 452, an indicator ribbon 457, the connecting unit 453 and the roller 456. The reel 452 and the indicator ribbon 457 constitute a height indicator unit 610. The indicator ribbon 457 has height measurement and winds about the spool 458 and the reel 452. One end of the connecting unit 453 is connected to the spool 458, while the other end thereof is connected to the roller elements 422. The movement of the roller element 422 brings about the rotation of the spool 458 through the connecting unit 453, and the reel 452 is also taken into rotation. Because the position of the roller element 422 is related to the height of the platform 410, the distance travelled by the indicator ribbon 457 is associated with the height of the platform 410. As a result, the height of the platform 410 can be deduced from the walking distance of the indicator ribbon 457, and the height can be displayed through the height displaying window 451.

The height measurement on the indicator 457 should be marked after the relationship between the height of the platform 410 and the rotation distance of the indicator ribbon 457. Different variable height trolleys have different mechanical structure, and therefore the height measurement may have varied standards. Likewise, the height indicator 154 in the first embodiment has the same characteristic. The indicator ribbon 457 is equivalent to winding a height indicator about the spool 458 and the reel 452, such that as the roller element 422 rotates, the serial mechanical action results in the generation of the height of the platform 410.

Figure 7:
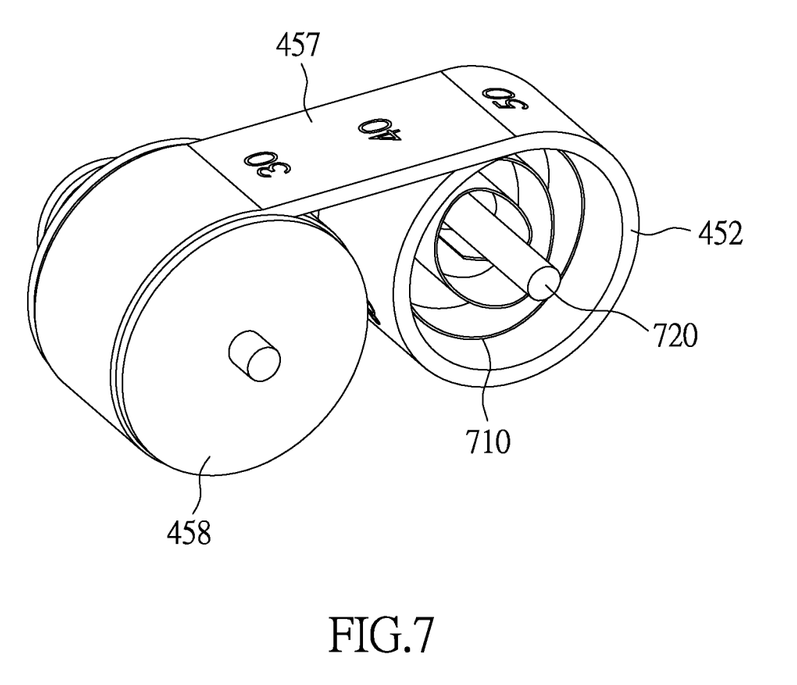
FIG. 7 shows a perspective view of a spool 458 and a reel 452 in accordance with a second embodiment of the instant disclosure.

Please refer to FIG. 7. FIG. 7 shows a perspective view of the spool 458 and reel 452 in accordance with the second embodiment of the instant disclosure. The reel 452 includes the shaft 720 and the torsion spring 710. The shell of the reel 452 may act as a stem for receiving the indicator ribbon 457. The spool 458 shares similar structure features with the reel 452. When the connecting unit 453 is pulled by the roller element 422, the spool 458 is dragged by the connecting unit 453 and a driving force is stored in the torsion spring (not shown). The spool 458 rotates and brings about the rotation of the reel 452 by the indicator ribbon 457, and a driving force is accumulated on the reel 452 in the process. Meanwhile, the indicator ribbon 457 travels along the spool 458 and the reel 452 and shows the relevant height figure of the platform 410 on the height displaying window 451.

When the roller element 422 travels reversely (i.e., the height of the platform is lowered), the spool 458 receives the connecting unit 453, and the reel 452 rotates reversely to receive the indicator ribbon 457. In this regard, the accurate height of the platform 410 is adjusted and provided through the height displaying window 451.

The spool 458 and the reel 452 may recycle the thread via different structures, for example, by a spring, and the instant disclosure is not limited thereto.

The roller elements 122, 422 of the abovementioned first and second embodiments are disposed on the rails 210, 410. However, these are merely exemplary implementation, and the roller element 122, 422 may be replaced by other element on the supporting frames 140, 440. For example, the connecting units 153, 453 may be connected to the roller element disposed on the base 160 close to the bottom of the scissor links. Alternatively, the connecting units 153, 453 may be connected to the end portion of the scissor links close to the roller elements 122, 422. Since one end of the scissor links move relative to the height adjustment of the platforms 110, 410, the scissor links may replace the roller elements 122, 422 to drag the connecting units 153, 453. The connecting units 153, 453 may be threads that mediate the associated actions between the height displaying assemblies 150, 450 and the platform 110. Further, the supporting frames 140, 440 of the abovementioned first and second embodiments may be implemented by other mechanical structures, e.g. a mechanical assembly, a supporting brace or a supporting holder, but are not limited thereto. A person skilled in the art should be able to realize the instant disclosure according to the above description.

In short, the variable height trolley has height displaying assembly that can automatically provide instant height information of the platform, such that the operation of trolley is more convenient and easier.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:
1. A variable height trolley comprising:
a platform having a height displaying window;
a supporting frame connected to the platform, wherein the supporting frame is reconfigurable to selectively change a height of the platform, the supporting frame includes a roller element that changes a position relative to the height of the platform; and a height displaying assembly disposed on the platform and displaying the height of the platform from the height displaying window, the height displaying assembly including:
  a height indicator unit movably disposed on the platform and exposable from the height displaying window for displaying the height of the platform from the height displaying window;
  a spool attached to the platform; and
  a connecting unit movably coupled to the height indicator unit and having a first end and a second end opposite to the first end, the first end of the connecting unit movably connected to the spool, and the second end of the connecting unit movably connected to the roller element to allow the height indicator unit to move with the connecting unit for displaying the height of the platform relative to a movement of the roller element.

2. The variable height trolley according to claim 1, wherein the height displaying assembly further comprises:
  a guiding assembly disposed adjacent to the connecting unit to change a direction of connecting unit propagation; and
  a guiding roller disposed adjacent to the connecting unit to change the direction of connecting unit propagation;
  wherein the guiding assembly and the guiding roller are disposed between the spool and the roller element.

3. The variable height trolley according to claim 1, wherein the height indicator unit further comprises:
  a height indicator disposed on a top surface of the platform; and
  a cursor connected to the connecting unit and movable along with the connecting unit.

4. The variable height trolley according to claim 1, wherein the spool includes a torsion spring to drive the connecting unit.

5. The variable height trolley according to claim 1, wherein the supporting frame further comprises:
  a base;
  a rail disposed underneath the platform to accommodate the roller element;
  a first link disposed between the base and the platform; and
  a second link disposed between the base and the platform;
  wherein the roller element is pivotally connected to one end of the first link and movable along the rail.

6. The variable height trolley according to claim 1, wherein the height displaying assembly further comprises:
  a guiding roller disposed adjacent to the connecting unit to change a direction of connecting unit propagation;
  wherein the guiding roller is disposed between the spool and the roller element.

7. The variable height trolley according to claim 1, wherein the height indicator unit further comprises:
  a reel interactive with the spool; and
  an indicator ribbon winding about the spool and the reel;
  wherein the spool and the reel are rotatable;
  wherein when the second end of the connecting unit is pulled by the roller element, the spool is dragged by the first end of the connecting unit such that the spool and the reel rotationally drive the indicator ribbon to move.

8. A height displaying assembly disposed on a variable height trolley, the trolley including a platform and a supporting frame connected to the platform, the platform having a height displaying window, the supporting frame reconfigurable to selectively change a height of the platform, and the supporting frame having a roller element changing a position relative to the height of the platform, the height displaying assembly comprising:
  a height indicator unit movably disposed on the platform and exposable from the height displaying window for displaying the height of the platform through the height displaying window;
  a spool disposed on the platform; and
  a connecting unit movably coupled to the height indicator unit and having a first end and a second end opposite to the first end, the first end movably connected to the spool, and the second end movably connected to the roller element to allow the height indicator unit to move with the connecting unit for displaying the height of the platform relative to a movement of the roller element.

9. The variable height trolley according to claim 8, wherein the height displaying assembly further comprises:
  a guiding assembly disposed adjacent to the connecting unit to change a direction of connecting unit propagation; and
  a guiding roller disposed adjacent to the connecting unit to change the direction of connecting unit propagation;
  wherein the guiding assembly and the guiding roller are disposed between the spool and the roller element.

10. The variable height trolley according to claim 8, wherein the height indicator unit further comprises:
  a height indicator disposed on a top surface of the platform; and
  a cursor connected to the connecting unit and movable along with the connecting unit.

11. The variable height trolley according to claim 8, wherein the spool includes a torsion spring to drive the connecting unit.

12. The variable height trolley according to claim 8, the height displaying assembly further comprises:
  a guiding roller disposed adjacent to the connecting unit to change a direction of connecting unit propagation;
  wherein the guiding roller is disposed between the spool and the roller element.

13. The variable height trolley according to claim 8, wherein the height indicator unit further comprises:
  a reel interactive with the spool; and
  an indicator ribbon wound about the spool and the reel;
  wherein the spool and the reel are rotatable;
  wherein when the second end of the connecting unit is pulled by the roller element, the spool is dragged by the first end of the connecting unit such that the spool and the reel rotationally drive the indicator ribbon to move.

* * * * *